United States Patent
Noya et al.

(10) Patent No.: US 11,059,995 B2
(45) Date of Patent: Jul. 13, 2021

(54) FILM FORMING COMPOSITION

(71) Applicant: Merck Patent GmbH, Darmstadt (DE)

(72) Inventors: Go Noya, Kakegawa (JP); Masahiko Kubo, Kakegawa (JP); Noboru Satake, Kakegawa (JP); Yoshio Nojima, Kakegawa (JP); Yuki Ozaki, Kakegawa (JP); Toshiya Okamura, Kakegawa (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/500,253

(22) PCT Filed: Apr. 3, 2018

(86) PCT No.: PCT/EP2018/058383
§ 371 (c)(1),
(2) Date: Oct. 2, 2019

(87) PCT Pub. No.: WO2018/185044
PCT Pub. Date: Oct. 11, 2018

(65) Prior Publication Data
US 2020/0377761 A1    Dec. 3, 2020

(30) Foreign Application Priority Data

Apr. 4, 2017 (JP) .............................. JP2017-074755

(51) Int. Cl.
| | | |
|---|---|---|
| *C09D 183/16* | (2006.01) | |
| *C08K 5/17* | (2006.01) | |
| *C08K 5/29* | (2006.01) | |
| *C08K 5/31* | (2006.01) | |
| *C08K 5/3445* | (2006.01) | |
| *C08K 5/3447* | (2006.01) | |
| *C08K 5/3462* | (2006.01) | |
| *C08K 5/35* | (2006.01) | |
| *C08K 5/357* | (2006.01) | |

(52) U.S. Cl.
CPC .............. *C09D 183/16* (2013.01); *C08K 5/17* (2013.01); *C08K 5/175* (2013.01); *C08K 5/29* (2013.01); *C08K 5/31* (2013.01); *C08K 5/3445* (2013.01); *C08K 5/3447* (2013.01); *C08K 5/3462* (2013.01); *C08K 5/35* (2013.01); *C08K 5/357* (2013.01)

(58) Field of Classification Search
None
See application file for complete search history.

(56) References Cited

U.S. PATENT DOCUMENTS

| | | | | |
|---|---|---|---|---|
| 4,694,060 A | * | 9/1987 | Porte ................... | C04B 35/571 528/14 |
| 6,310,168 B1 | * | 10/2001 | Shimizu ............... | C08G 77/62 528/28 |
| 6,756,469 B2 | | 6/2004 | Lukacs, III | |
| 8,841,399 B2 | * | 9/2014 | Yang .................... | C07C 279/00 528/23 |

FOREIGN PATENT DOCUMENTS

| | | |
|---|---|---|
| JP | H08176511 A | 7/1996 |
| JP | H08176512 A | 7/1996 |
| JP | H0931333 A | 2/1997 |
| JP | H1160736 A | 3/1999 |
| JP | 2004536196 A | 12/2004 |
| JP | H11116196 A | 12/2004 |
| WO | WO-2016169631 A1 | 10/2016 |

OTHER PUBLICATIONS

U.S. Appl. No. 16/500,176, filed Oct. 2, 2019, Ozaki et al.
International Search Report for PCT/EP2018/058383 dated Jan. 31, 2019.
Written Opinion of the International Searching Authority for PCT/EP2018/058383 dated Jan. 31, 2019.

* cited by examiner

*Primary Examiner* — Satya B Sastri
(74) *Attorney, Agent, or Firm* — Faegre Drinker Biddle & Reath LLP

(57) ABSTRACT

[Problem] To provide a film forming composition curable at low temperature and a film forming method using the same. [Means for Solution] A film forming composition comprising a polysilazane, an organic solvent and aspecific additive, and a film forming method comprising applying it on a substrate and curing. The specific additive is selected from the group consisting of (A) guanidines substituted by a hydrocarbylgroup, (B) crown ether amines containing oxygen and nitrogen as a member thereof, (C) cycloalkanes having an amino-substituted polycyclic structure, (D) oximes substituted by a hydrocarbyl group, and (E) imidazolines.

20 Claims, No Drawings

FILM FORMING COMPOSITION

CROSS-REFERENCE TO RELATED APPLICATIONS

This application is a national stage application (under 35 U.S.C. § 371) of PCT/EP2018/058383. filed Apr. 3, 2018, which claims benefit of Japanese Application No. 2017-074755, filed Apr. 4.2017, both of which are incorporated herein by reference in their entirety.

BACKGROUND OF THE INVENTION

Technical Field

The present invention relates to a composition comprising polysilazane. More particularly, it relates to a film forming composition capable of forming a dense siliceous film by curing reaction at low temperature.

Background Art

Polysilazane has properties to be converted into a siliceous substance by heating. When general polysilazane was used alone, there were many points to be improved, such as slow conversion rate to the siliceous substance and necessity of high temperature for conversion to the siliceous substance. For this reason, various studies have been made in order to improve such points.

For example, it has been studied to improve the above-mentioned problems by modifying the polysilazane per se or combining a polysilazane-containing composition with a specific additive. Specifically, as a method for enabling formation of a siliceous film at low temperature, there have been proposed some methods, in which following ones are respectively added to the polysilazane-containing composition: an N-heterocyclic compound (for example, Patent Document 1), an alkanolamine (for example, Patent Document 2), and amines and/or acids (for example, Patent Document 3). The amine compounds utilized in these documents have been utilized also for other purposes, specifically in a composition to which a diamine compound is added to reduce irregularities on a film surface and coating unevenness (for example, Patent Documents 4 and 5), and in a composition to which polyamine is added to cure epoxy resin (for example, Patent Document 6).

However, according to the studies of the inventors of the present invention, in case of the conventionally known compositions, the curing rate at low temperature such as room temperature was insufficient and heating or the like was sometimes required to improve the curing rate.

PRIOR ART DOCUMENTS

Patent Documents

[Patent document 1] JP-A No. H11 (1999)-116815
[Patent document 2] JP-A No. H11 (1999)-60736
[Patent Document 3] JP-A No. H9 (1997)-31333
[Patent Document 4] JP-A No. H8 (1996)-176511
[Patent Document 5] JP-A No. H8 (1996)-176512
[Patent Document 6] JP-A No. 2004-536196

SUMMARY OF THE INVENTION

Problems To Be Solved By The Invention

In view of the above circumstances, an object of the present invention is to provide a polysilazane composition capable of curing at low temperature.

Means For Solving The Problems

The film forming composition according to the present invention is characterized by comprising:
a polysilazane,
an organic solvent, and
at least one type of additive selected from the group consisting of the following:
(A) guanidines substituted by a hydrocarbyl group,
(B) crown ether amines containing oxygen and nitrogen as a member thereof,
(C) cycloalkanes having an amino-substituted polycyclic structure,
(D) oximes substituted by a hydrocarbyl group, and
(E) imidazolines.

Further, the film forming method according to the present invention comprises applying said composition on a substrate and curing it.

Furthermore, electronic devices, medical devices, packaging containers or wrapping papers according to the present invention is characterized by comprising the film formed by said method.

Effects Of The Invention

The composition according to the present invention can be cured at low temperature after it is applied on a substrate surface or the like. The curing temperature and the curing rate can be adjusted by the adding amount of the additive, and it is possible to obtain a film which is sufficiently cured, for example, at room temperature or the like. Furthermore, the composition according to the present invention also has excellent coatability.

DETAILED DESCRIPTION OF THE INVENTION

Mode For Carrying Out The Invention

Embodiments of the present invention are described below in detail.

In the present specification, when numerical ranges are indicated using "to", unless otherwise specifically mentioned, they include both endpoints, and units thereof are common. For example, 5 to 25 mol % means not less than 5 mol % and not more than 25 mol %.

In the present specification, the descriptions such as "$C_{x-y}$", "$C_x$-$C_y$" and "$C_x$" mean the number of carbons in a molecule or substituent. For example, $C_{1-6}$ alkyl means alkyl having not less than 1 and not more than 6 carbons (methyl, ethyl, propyl, butyl, pentyl, hexyl etc.).

In the present specification, unless otherwise specifically mentioned, "alkyl" means a linear or branched alkyl, and "cycloalkyl" means alkyl containing a cyclic structure. Those in which a cyclic structure is substituted with a linear or branched alkyl are also referred to as cycloalkyl. Further, those having a polycyclic structure such as bicycloalkyl are also included in cycloalkyl. "Heteroalkyl" means alkyl containing oxygen or nitrogen in the main chain or side chain unless otherwise specifically mentioned and means, for example, alkyl including oxy, hydroxy, amino, carbonyl and the like. Further, "hydrocarbyl group" means a monovalent, divalent or higher group comprising carbon and hydrogen and optionally containing oxygen or nitrogen. Furthermore, in the present specification, unless otherwise specifically mentioned, "alkylene" means a divalent group corresponding to said alkyl and includes, for example, a linear alkylene or a branched alkylene having a side chain.

In the present specification, when polymer has plural types of repeating units, these repeating units copolymerize. Unless otherwise specifically mentioned, these copolymerization is any of alternating copolymerization, random copolymerization, block copolymerization, graft copolymerization, or a mixture thereof.

In the present specification, unless otherwise specifically mentioned, Celsius is used as the temperature unit. For example, 20 degrees means 20 degrees Celsius.

In the present specification, unless otherwise specifically mentioned, "%" means "% by mass" and "parts" means "parts by mass".

Film Forming Composition

The film forming composition according to the present invention (hereinafter sometimes referred to as "composition") comprises, as essential components, a polysilazane, an organic solvent, and a specific additive, and optionally contain other additional components.

These components are explained below.

Polysilazane

Although polysilazane used in the composition according to the present invention is not particularly limited, it typically has a structural unit represented by the following general formula (1):

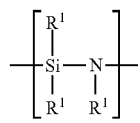

(1)

wherein
$R^1$s are groups each independently selected from the group consisting of hydrogen, alkyl, alkenyl, cycloalkyl, aryl, alkoxy, amino, alkoxysilylalkyl, alkylsilyl and silyl. When $R^1$ is a group other than hydrogen, $R^1$ is unsubstituted or substituted by one or more of groups selected from the group consisting of halogen, alkyl, alkoxy, amino, silyl and alkylsilyl. Specific examples of such $R^1$ having a substituent are groups selected from the group consisting of fluoroalkyl, perfluoroalkyl, silylalkyl, trisilylalkyl, alkylsilylalkyl, trialkylsilyl, alkoxysilylalkyl, fluoroalkoxy, silylalkoxy, alkylamino, dialkylamino, alkylaminoalkyl, alkylsilyl, dialkylsilyl, alkoxysilyl, dialkoxysilyl and trialkoxysilyl. Among them, said $R^1$s are preferably groups each independently selected from the group consisting of (a) hydrogen, (b) alkyl such as methyl, ethyl or propyl, (c) alkenyl such as vinyl or allyl, (d) aryl such as phenyl, (e) alkylsilyl such as trimethylsilyl, and (f) alkoxysilylalkyl such as triethoxysilylpropyl.

Polysilazane mainly comprising a structural unit represented by said general formula (1) is one having a linear structure. However, it is also possible in the present invention to use polysilazane having a structure other than it, namely, a branched chain structure or a cyclic structure. Such polysilazane comprises structures of the following formulae:

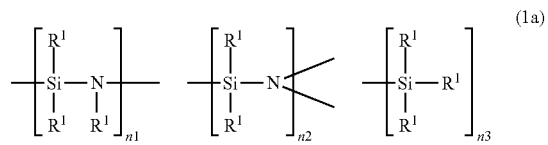

(1a)

wherein
n1, n2 and n3 represent the polymerization ratio, and usually, n1+n2+n3 is 1.

Polysilazane represented by these formulae is categorized into organopolysilazane, wherein $R^1$ contains an organic group, and perhydropolysilazane, wherein all of $R^1$s are hydrogen. In addition, in the present invention, it is preferable to use perhydropolysilazane, wherein all of $R^1$s are hydrogen. These polysilazane can be produced by any conventionally known method.

It is also possible to use metallopolysilazane modified with a metal compound at a part of these polysilazane, borosilazane containing boron, polysilazane containing a silicone structure, or the like. In the present invention, those including these modified polysilazane are conveniently called polysilazane. In the present invention, two or more of these polysilazane can also be used in combination.

Although the molecular weight of polysilazane to be used in the present invention is not particularly limited, for example, its number average molecular weight in terms of polystyrene is preferably in the range of 200 to 10,000, more preferably in the range of 400 to 5,000.

Organic Solvent

The composition according to the present invention comprises a solvent capable of dissolving said polysiloxane and a specific additive to be described below. The solvent is not particularly limited as long as it can dissolve the components to be used. Preferred examples of the solvent include the following:

(a) aromatic hydrocarbon compounds, such as benzene, toluene, xylene, ethylbenzene, diethylbenzene, trimethylbenzene, triethylbenzene and tetrahydro-naphthalene;

(b) saturated hydrocarbon compounds, such as n-pentane, i-pentane, n-hexane, i-hexane, n-heptane, i-heptane, n-octane, i-octane, n-nonane, i-nonane, n-decane and i-decane;

(c) alicyclic hydrocarbon compounds, such as ethylcyclohexane, methylcyclohexane, cyclohexane, cyclohexene, p-menthane, decahydronaphthalene, dipentene and limonene;

(d) alkyl ethers, such as dipropyl ether, dibutyl ether, diethyl ether, dipentyl ether, dihexyl ether, methyl tertiary butyl ether (hereinafter, referred to as MTBE) and anisole; and (e) ketones, such as methyl isobutyl ketone (hereinafter, referred to as MIBK).

Among them, (a) aromatic hydrocarbon compounds, (b) saturated hydrocarbon compounds, (c) alicyclic hydrocarbon compounds, and (d) alkyl ethers are preferred, and xylene and dibutyl ether are particularly preferred.

These solvents can be used properly in combination of two or more, so as to control the evaporation rate of the solvent, to reduce the hazardousness to the human body, or to control the solubility of the components.

As such a solvent, it is also possible to use commercially available solvents. For example, T-SOL 3040, T-SOLAN 45, Exxsol D30, Exxsol D40, Exxsol D80, Solvesso 100, Solvesso 150, Isopar H, Isopar L (trade name: manufactured by TonenGeneral Sekiyu KK), New Solvent A, Cactus Fine SF-01, Cactus Fine SF-02 (trade name: manufactured by JX Energy Corporation), Shellsol MC311, Shellsol MC811, Sol Eight Deluxe, New Shell Bright Sol (trade name: manufactured by Shell Chemicals Japan Ltd.) are commercially available, and these can also be used.

Incidentally, if a mixture of solvents is used, the content of an aromatic hydrocarbon compound is preferably not more than 30% by mass based on the total mass of the solvent mixture from the viewpoint of reducing the hazardousness to the human body.

Additive

The composition according to the present invention comprises a specific additive. This additive is required to contain nitrogen in the structure and further have a specific structure. That is, the additive to be used in the present invention is selected from the group consisting of the following:

(A) guanidines substituted by a hydrocarbyl group, (B) crown ether amines containing oxygen and nitrogen as a member thereof, (C) cycloalkanes having an amino-substituted polycyclic structure, (D) oximes substituted by a hydrocarbyl group, and (E) imidazolines.

[Additive (A)]

The additive (A) is guanidines substituted by a hydrocarbyl group. Any unsubstituted guanidines are not used in the present invention. Among such guanidines, preferred ones are represented by the following general formula (A):

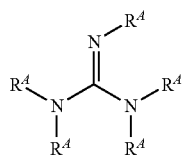

(A)

wherein $R^4$s are each independently hydrogen or a monovalent $C_{1-20}$ hydrocarbyl group, or any two of $R^4$s are bonded with a bivalent $C_{1-20}$ hydrocarbyl group to form a cyclic structure, or each two $R^4$s of any four of $R^4$s are bonded with a bivalent $C_{1-20}$ hydrocarbyl group to form two cyclic structures, provided that at least one of $R^4$s is not hydrogen.

Here, $R^4$ is preferably selected from the group consisting of a $C_{1-3}$ alkyl, a $C_{5-8}$ cycloalkyl, a $C_{6-10}$ aryl, a $C_{1-6}$ alkylene, and a $C_{1-6}$ heteroalkylene. When $R^4$ is a bivalent group, its end points are bonded with nitrogen to form a nitrogen-containing heterocyclic ring.

Further, the molecular weight of the additive (A) is not particularly limited, but the molecular weight is preferably not less than 80, and more preferably not less than 110.

Specific examples of such additives include the following compounds:

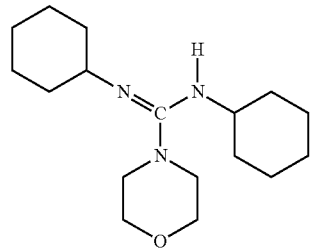

(A-1)

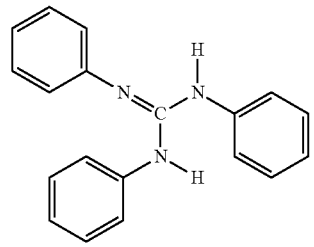

(A-2)

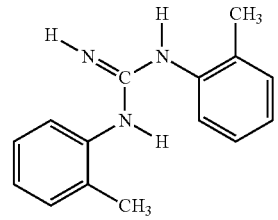

(A-3)

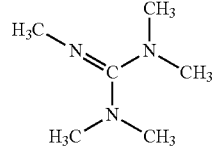

(A-4)

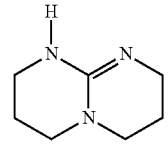

(A-5)

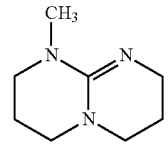

(A-6)

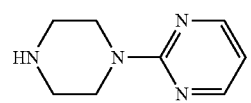

(A-7)

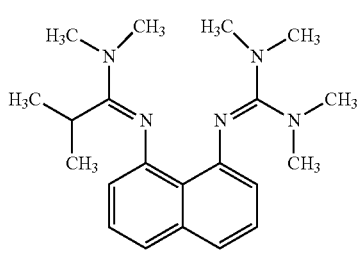
(A-8)

(A-9)

Among them, (A-1) to (A-4) and (A-7) are preferable.

[Additive (B)]

The additive (B) is crown ether amines containing oxygen and nitrogen as a member thereof. Among such crown ether amines, preferred ones are represented by the following general formula (B):

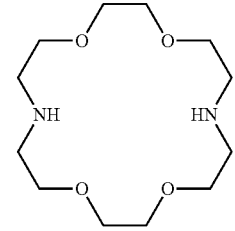
(B)

wherein
L is a linker consisting of the following linker unit (B1) and the following linker unit (B2)

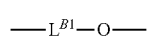
(B1)

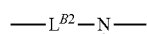
(B2)

wherein
$L^{B1}$ and $L^{B2}$ are each independently a $C_{1-6}$ alkylene, and $L^{B1}$ and $L^{B2}$ are bonded with oxygen or nitrogen of other linker unit, $R^B$ is hydrogen, a $C_{1-3}$ alkyl, a $C_{1-3}$ heteroalkyl, a $C_{6-10}$ aryl, or a $C_{6-10}$ heteroaryl, and L comprises at least one linker unit (B1) and at least one linker unit (B2), and the total number of linker units included in L is 2 to 10.

Here, $L^{B1}$ and $L^{B2}$ are each independently, preferably a $C_{2-4}$ alkylene, particularly preferably ethylene. Further, $L^{B1}$ and $L^{B2}$ are preferably identical.

$R^B$ is preferably hydrogen or a $C_{6-10}$ aryl.

The total number of linker units included in L is preferably a number of 4 to 10.

In addition, in the formula (B), the bonding order of the two kinds of linker units (B1) and (B2) is not particularly limited, and, for example, each unit is bonded by block polymerization, alternating polymerization, or random polymerization.

Specific examples of such additives include the following compounds:

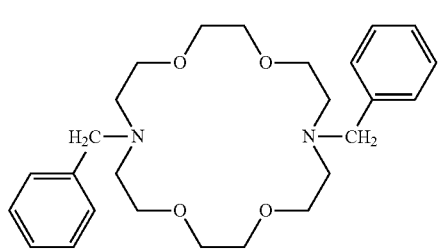
(B-1)

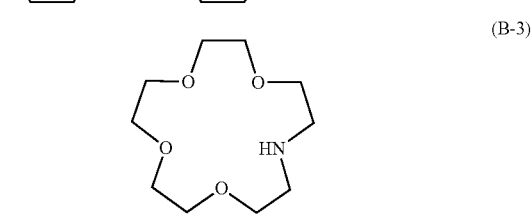
(B-2)

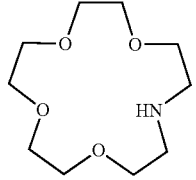
(B-3)

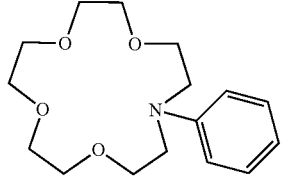
(B-4)

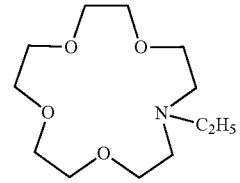
(B-5)

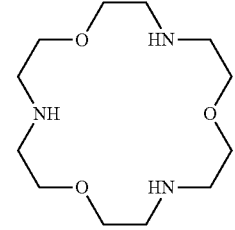
(B-6)

(B-7)

Among them, (B-1) to (B-4) are preferable.

[Additive (C)]

The additive (C) is cycloalkanes having an amino-substituted polycyclic structure. Here, "amino" is any of primary, secondary, or tertiary amino. Further, the cycloalkane having a polycyclic structure has a plurality of cyclic structures, and may be crosslinked or have a spiro structure. Specific examples of the polycyclic structure include bicycloalkane, tricycloalkane, adamantane, norbornane and the like. Among such compounds, preferred ones are adamantanes, for example, represented by the following general formula (C):

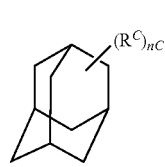

(C)

wherein nC is a number of 1 to 16, and $R^C$s are each independently amino, hydroxy, carboxy, a $C_{1-10}$ hydrocarbyl group or an amino-substituted $C_{1-10}$ hydrocarbyl group, and at least one $R^C$ contains amino.

$R^C$ is preferably a $C_{1-6}$ alkyl, amino, a $C_{1-6}$ aminoalkyl, a $C_{1-6}$ alkylaminoalkyl, a $C_{1-6}$ aminoalkylamino, hydroxy, or carboxy, provided that at least one $R^c$ contains amino.

Specific examples of such additives include the following compounds:

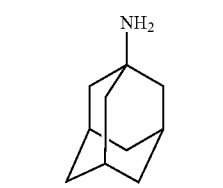

(C-1)

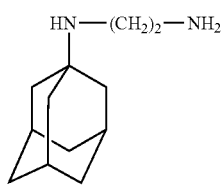

(C-2)

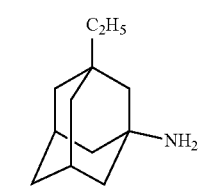

(C-3)

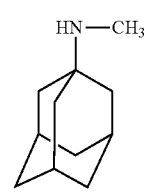

(C-4)

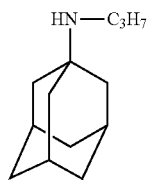

(C-5)

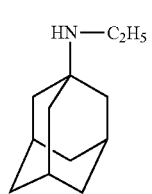

(C-6)

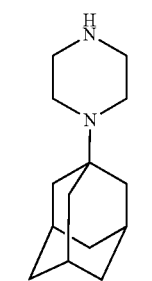

(C-7)

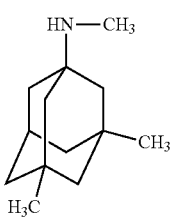

(C-8)

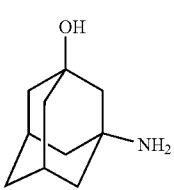

(C-9)

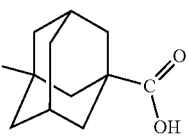

(C-10)

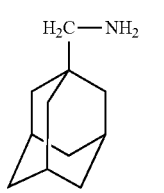

(C-11)

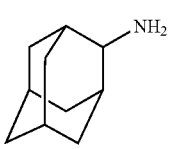

(C-12)

(C-13)

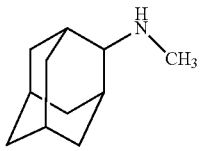

Among them, (C-1) and (C-2) are preferable.

Further, besides adamantanes, bicycloalkanes and the like can also be used, and the following compounds can also be mentioned:

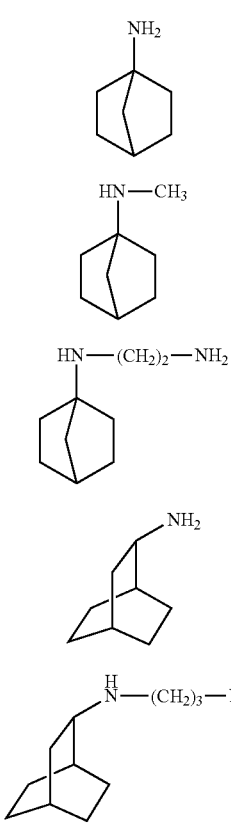

(C-14)

(C-15)

(C-16)

(C-17)

(C-18)

The additive (D) is oximes substituted by a hydrocarbyl group, and among such compounds, preferred ones are represented by the following general formula (D):

(D)

wherein $R^D$s are each independently hydrogen or a monovalent $C_{1-20}$ hydrocarbyl group, or two $R^D$s are bonded with a bivalent hydrocarbyl group to form a cyclic structure.

Among such compounds, those wherein RD is a $C_{1-10}$ aryl or a $C_{1-10}$ heteroaryl are preferable.

Further, it is also preferable that two $R^D$s are bonded with a bivalent alkylene or cycloalkylene and the oximes represented by the general formula (D) has a cyclic structure. Here, the cycloalkylene is not limited to one containing a single ring and it has or has not a polycyclic structure. In particular, those in which the formed cyclic structure is a polycyclic structure such as adamantane or norbornane are preferred.

The molecular weight of these additives is not particularly limited, but the molecular weight is preferably not less than 120. Specific examples of such additives include the following compounds:

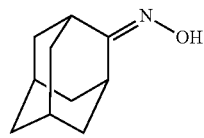

(D-1)

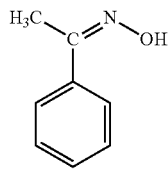

(D-2)

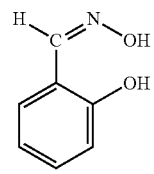

(D-3)

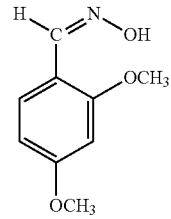

(D-4)

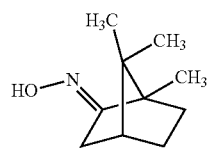

(D-5)

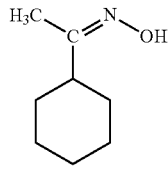

(D-6)

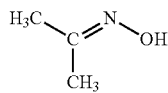

(D-7)

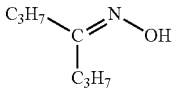

(D-8)

-continued

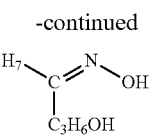
(D-9)

Among them, (D-1) to (D-4) are preferable.

The additive (E) is imidazolines, and among such compounds, preferred ones are represented by the following general formula (E):

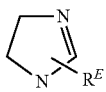
(E)

wherein
$R^E$ is a $C_{1-20}$ hydrocarbyl group.

Here, $R^E$ is preferably a $C_{1-15}$ alkyl or a $C_{6-20}$ aryl. In addition, the molecular weight of the imidazolines to be used is preferably not less than 110.

Specific examples of such additives include the following compounds:

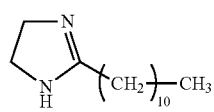
(E-1)

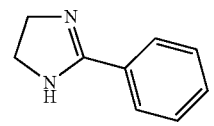
(E-2)

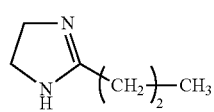
(E-3)

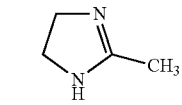
(E-4)

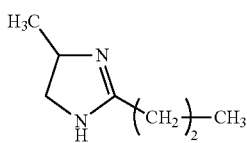
(E-5)

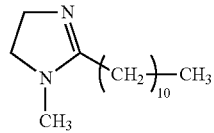
(E-6)

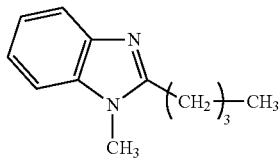
(E-7)

Among them, (E-1) to (E-4) are preferable.

In the composition according to the present invention, two or more of these additives can be used in combination.

Additional Component

The composition according to the present invention also comprise additional components as necessary. Such components include, for example, viscosity modifiers, crosslinking accelerators, inorganic catalysts, siloxane compounds, crosslinking agents such as silane coupling agents, and fillers such as metal fine particles and inorganic oxides. The metal fine particles are thought to have an effect of reducing the curing temperature of the composition, and have an effect of promoting crosslinking. Specifically, examples of the metal fine particles include Ag, Au, Pd, Ni, and the like, and Ag is preferable. The average particle diameter of the metal fine particles is preferably not more than 0.5 pm. Further, examples of the inorganic oxides include transition metal oxides, alkaline earth metal oxides, and the like, and more specifically, $MgO$, $CaO$, $BaO$, $ZnO$, $V_2O_5$, $Fe_2O_3$, $Mo_2O_3$, $SnO$, $CdO$, and the like. Further, as the additional component, amine compounds or metal complex compounds can be mentioned. These compounds work as a catalyst when the composition coated on a substrate undergoes a curing reaction.

Film forming composition

The composition according to the present invention is prepared by dissolving or dispersing said polysilazane, the specific additive and optionally the additional components in said organic solvent. Here, the order of dissolving each component in the organic solvent is not particularly limited. Further, it is also possible to replace the solvent after reacting the ingredients.

Further, the content of each of said components varies depending on the purpose of use of the desired composition. The content of the specific additive to be used can be appropriately adjusted according to the purpose. In general, when the content of the additive is large, the obtained film properties are inferior and gelation of the composition tends to proceed, so that handling thereof becomes difficult, which is not preferable. Further, when the content of the additive is small, it takes time to convert into silica, which is not preferable. Therefore, the composition according to the present invention preferably contains 0.01 to 5 mmol, more preferably 0.1 to 2 mmol of the specific additive, based on 1 g of polysilazane.

Further, in the present invention, the content of the polymer component is preferably 0.1 to 60% by mass, more preferably 0.1 to 30% by mass, based on the total mass of the composition, in order to form a film having a sufficient thickness.

In addition, the content of the components other than the polysilazane, the organic solvent and the specific additive in the entire composition is preferably not more than 50%, more preferably not more than 30%, based on the total mass.

Film forming method

The film forming method according to the present invention is characterized by comprising applying said film forming composition on a substrate and curing it.

The substrate for applying the composition is not particularly limited, and selected from any of organic materials, inorganic materials, metals, and the like. For example, a suitable substrate such as a silicon substrate, a glass substrate, a resin film or the like can be used. On these substrates, various semiconductor devices and the like can be formed as necessary. Further, since the curing reaction of the composition according to the present invention proceeds at relatively low temperature, a flexible film containing an organic material can also be used as a substrate. As the organic material, plastic films, such as polyethylene naphthalate, polyethylene terephthalate, polystyrene, polypropylene, polyethylene, polyimide, polyamide, cellulose acetate, acryl, polycarbonate, and vinyl chloride are preferable. Among them, polyethylene naphthalate or polyethylene terephthalate is particularly preferred from the viewpoint of heat resistance and transparency.

As the method for applying the composition on the substrate surface, it is possible to select from conventionally known methods such as a spin coating method, a dipping method, a spray method, a transfer method, a roll coating, a bar coating, a brush coating, a doctor coating, a flow coating, and a slit coating, and the like. When the substrate is a film, gravure coating can also be used. If desired, a drying step may be separately provided after coating. Further, if necessary, the coating step can be repeated once or twice or more to form the desired film thickness of the coating film.

The composition layer formed on a substrate surface is generally cured under temperature condition of 150° C. or less, preferably 130° C. or less. In particular, the composition according to the present invention can also be cured by leaving it at room temperature without heating. In this case, when the curing is performed in an atmosphere containing water vapor, the content of water vapor is preferably not less than 0.1%, more preferably not less than 1%, based on the volume. In the present invention, it is preferable to perform the curing particularly under a mixed gas atmosphere containing oxygen and water vapor.

The curing of the composition layer can also be performed by combining the treatments selected from the group consisting of heat treatment, humidification treatment, light irradiation, UV ozone treatment, plasma treatment, corona treatment, electron beam treatment, and combination thereof. By combining these treatments, a dense siliceous film can be formed.

Siliceous Film And Substrate With Siliceous Film

The siliceous film according to the present invention and the substrate with the siliceous film are produced using said composition. As long as the composition according to the present invention is used, the production conditions and the like are not particularly limited, and they can be produced, for example, by above-mentioned methods. These siliceous films or substrates with the siliceous film are used in the field of electronic materials as an interlayer insulating film, a top protective film, an optical property modifying film, a primer for a protective film and the like of electronic devices. Also in other fields than electronic materials, they are also useful as a protective film, an adhesive film and the like on a surface of the substrate such as metal, glass, plastic and the like. Furthermore, this film can also be applied to medical devices, packaging containers or wrapping papers.

The present invention is explained below by use of the following examples.

EXAMPLES 1 TO 51 AND COMPARATIVE EXAMPLES 1 AND 2

Perhydropolysilazane (number average molecular weight: 800) and an additive were dissolved in xylene and filtered through a PTFE membrane filter having a pore size of 0.2 μm to obtain a composition. The content of perhydropolysilazane in the composition was set to be 8% by mass based on the composition. Types and concentrations of the additives were as shown in Table 1.

Each of the obtained compositions was coated on a 4 inch silicon wafer using a spin coater (manufactured by Mikasa Co., Ltd.). The coating conditions were set so that the film thickness of the obtained film to be 200 nm Thereafter, the coated film was cured under the conditions of room temperature, 80° C. or 130° C.

Progress of the curing was observed by FT-IR. The time (days) required for complete conversion of perhydropolysilazane to silica under each condition was measured. The obtained results were as shown in Table 1.

TABLE 1

| | additives | | the time required for complete conversion to silica (days) | | |
|---|---|---|---|---|---|
| | type | additional amount[*1] mmol/1 g-PHP | room temp. | 80° C. | 130° C. |
| Example 1 | A-1 | 0.29 | 3 | 1 | 0 |
| Example 2 | | 0.6 | 1 | 1 | 0 |
| Example 3 | A-2 | 0.29 | 3 | 3 | 7 |
| Example 4 | | 1 | 1 | 1 | 1 |
| Example 5 | | 2 | 1 | 1 | 1 |
| Example 6 | A-3 | 0.18 | 3 | 3 | 1 |
| Example 7 | | 0.29 | 3 | 1 | 1 |
| Example 8 | A-4 | 0.05 | 10 | 10 | 10 |
| Example 9 | | 0.1 | 1 | 3 | 3 |
| Example 10 | | 0.22 | 10 | 10 | 10 |
| Example 11 | A-5 | 0.01 | 20 | 20 | 20 |
| Example 12 | A-6 | 0.01 | 20 | 20 | 20 |
| Example 13 | A-7 | 0.29 | 7 | 30 | 30 |
| Example 14 | | 1 | 1 | 3 | 30 |
| Example 15 | B-1 | 0.07 | 10 | 10 | 10 |
| Example 16 | | 0.15 | 3 | 3 | 3 |
| Example 17 | | 0.29 | 1 | 1 | 1 |
| Example 18 | | 1 | 0 | 0 | 0 |
| Example 19 | B-2 | 0.07 | 14 | 14 | 14 |
| Example 20 | | 0.15 | 3 | 3 | 3 |
| Example 21 | | 0.29 | 3 | 3 | 3 |
| Example 22 | | 1 | 3 | 3 | 3 |
| Example 23 | B-3 | 0.07 | 14 | 14 | 30 |
| Example 24 | | 0.15 | 3 | 3 | 30 |
| Example 25 | | 0.29 | 1 | 1 | 10 |
| Example 26 | | 1 | 1 | 1 | 1 |
| Example 27 | B-4 | 0.29 | 30 | 30 | 30 |
| Example 28 | | 1 | 7 | 7 | 14 |
| Example 29 | | 2 | 3 | 3 | 7 |
| Example 30 | C-1 | 0.29 | 7 | 30 | 30 |
| Example 31 | | 1 | 7 | 7 | 14 |
| Example 32 | | 2 | 3 | 3 | 7 |
| Example 33 | C-2 | 0.058 | 3 | 3 | 3 |
| Example 34 | | 0.29 | 1 | 1 | 1 |
| Example 35 | D-1 | 0.29 | 14 | 14 | 20 |
| Example 36 | | 1 | 7 | 7 | 7 |
| Example 37 | D-2 | 0.29 | 30 | 30 | 30 |
| Example 38 | | 1 | 10 | 14 | 20 |
| Example 39 | | 2 | 7 | 7 | 7 |
| Example 40 | D-3 | 0.15 | 30 | 30 | 30 |
| Example 41 | | 0.29 | 14 | 14 | 14 |
| Example 42 | D-4 | 0.29 | 7 | 7 | 7 |
| Example 43 | | 1 | 7 | 7 | 7 |
| Example 44 | E-1 | 0.029 | 7 | 7 | 7 |
| Example 45 | | 0.15 | 3 | 3 | 3 |
| Example 46 | | 0.29 | 1 | 1 | 1 |
| Example 47 | E-2 | 0.15 | 3 | 10 | 20 |
| Example 48 | E-3 | 0.15 | 3 | 3 | 7 |
| Example 49 | | 1 | 1 | 1 | 1 |
| Example 50 | | 2 | 1 | 1 | 1 |
| Example 51 | E-4 | 0.15 | 10 | 10 | 10 |
| Comparative Example 1 | R-1 | 0.01 | impossible to be measured [*2] | impossible to be measured [*2] | impossible to be measured [*2] |
| Comparative Example 2 | — | — | no conversion | no conversion | no conversion |

[*1] The content of the additive was the amount of the additive (mmol) based on 1 g of perhydropolysilazane.
[*2] The additive R-1 was insoluble in the solution and it was impossible to be measured because the solution was gelated.

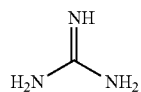

(R-1)

The invention claimed is:

1. A film forming composition comprising:
a polysilazane,
an organic solvent, and
an additive which is a crown ether amine containing oxygen and nitrogen as a member thereof, and represented by the following general formula (B):

(B)

wherein
L is a linker consisting of one or more of the following linker unit (B1) and one or more of the following linker unit (B2)

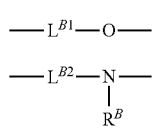

wherein
$L^{B1}$ and $L^{B2}$ are each independently a $C_{1-6}$ alkylene and $L^{B1}$ and $L^{B2}$ are bonded with oxygen or nitrogen of other linker unit, $R^B$ is hydrogen or a $C_{6-10}$ aryl, and the total number of linker units included in L is 2 to 10.

2. The composition according to claim 1, wherein $L^{B1}$ and $L^{B2}$ are each independently a $C_{2-4}$ alkylene and the total number of linker units included in L is a number of 4 to 10.

3. The composition according to claim 1, further comprising an additional additive which is a guanidine substituted by a hydrocarbyl group and represented by the following general formula (A):

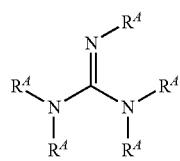

(A)

wherein
$R^A$ is selected from the group consisting of a $C_{1-3}$ alkyl, a $C_{5-8}$ cycloalkyl, a $C_{6-10}$ aryl, a $C_{1-6}$ alkylene, and a $C_{1-6}$ heteroalkylene.

4. The composition according to claim 1, which further comprises additive which is an imidazoline represented by the following general formula (E):

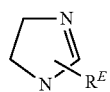

(E)

wherein
$R^E$ is a $C_{1-20}$ hydrocarbyl group.

5. The composition according to claim 4, wherein said $R^E$ is a $C_{1-15}$ alkyl or a $C_{6-20}$ aryl.

6. A film forming composition comprising:
a polysilazane,
an organic solvent, and
an additive which is a cycloalkane having an amino-substituted polycyclic structure and represented by the following general formula C:

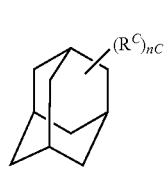

(C)

wherein
nC is a number of 1 to 16, and $R^c$s are each independently amino, hydroxy, carboxy, a $C_{1-10}$ hydrocarbyl group or an amino-substituted $C_{1-10}$ hydrocarbyl group, and at least one $R^c$ contains amino.

7. The composition according to claim 6, wherein said $R^c$ is a $C_{1-6}$ alkyl, amino, a $C_{1-6}$ aminoalkyl, a $C_{1-6}$ alkylaminoalkyl, a $C_{1-6}$ aminoalkylamino, hydroxy, or carboxy and at least one $R^c$ contains amino.

8. The composition according to claim 6, which further comprises additive which is an imidazoline represented by the following general formula (E):

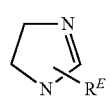

(E)

wherein
$R^E$ is a a $C_{1-20}$ hydrocarbyl group.

9. A film forming composition comprising:
a polysilazane,
an organic solvent, and
an additive which is an oxime substituted by a hydrocarbyl group and represented by the following general formula (D):

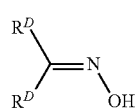

(D)

wherein
$R^D$s are each independently hydrogen or a monovalent $C_{1-20}$ hydrocarbyl group, with the proviso that at least one $R^D$ is a monovalent $C_{1-20}$ hydrocarbyl group or two $R^D$s are bonded with a bivalent hydrocarbyl group to form a cyclic structure.

10. The composition according to claim 9, wherein said $R^D$ is a $C_{1-10}$ aryl or a $C_{1-10}$ heteroaryl.

11. The composition according to claim 9, wherein said two $R^D$s are bonded with a bivalent alkylene or cycloalkylene and said oximes represented by the general formula (D) has a cyclic structure.

12. The composition according to claim 9, which further comprises additive which is an imidazoline represented by the following general formula (E):

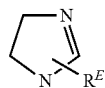

(E)

wherein
$R^E$ is a $_{1-20}$ hydrocarbyl group.

13. The composition according to claim 1, wherein said polysilazane comprises a structural unit of the following general formula (1):

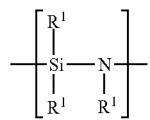

(1)

wherein
$R^1$s are groups each independently selected from the group consisting of hydrogen, alkyl, alkenyl, cycloalkyl, aryl, alkoxy, amino, alkoxysilylalkyl, alkylsilyl and silyl.

14. The composition according to claim 13, wherein said $R^1$s are groups each independently selected from the group consisting of hydrogen, alkyl, alkenyl, aryl, alkylsilyl and alkoxysilylalkyl.

15. The composition according to claim 1, wherein said polysilazane is perhydropolysilazane.

16. The composition according to claim 1, comprising 0.01 to 5 mmol of said additive based on 1 g of said polysilazane.

17. The composition according to claim 1, wherein the content percentage of said polysilazane is 1 to 60 mass % based on the total mass of said composition.

18. The composition according to claim 1, wherein said organic solvent comprises one or more kind of solvent which is aromatic hydrocarbon, saturated hydrocarbon compound, alicyclic hydrocarbon compound or alkyl ether.

19. A film forming method, comprising applying the composition according to claim 1 on a substrate and curing it.

20. An electronic device, a medical device, a packaging container or a wrapping paper, which comprises the film according to claim 19.

* * * * *